United States Patent [19]

Sasaki

[11] 4,224,557

[45] Sep. 23, 1980

[54] CONTROLLING UNIT FOR A.C. DRIVING AN ELECTROSTATIC DEVICE

[75] Inventor: Yasuo Sasaki, Kobe, Japan

[73] Assignees: Displaytek Corporation of Sanko; Daiwa Shinku Corporation, both of Japan

[21] Appl. No.: 923,408

[22] Filed: Jul. 10, 1978

[30] Foreign Application Priority Data

Jul. 13, 1977 [JP] Japan .................................. 52/84385

[51] Int. Cl.² ............................................. H02N 1/00
[52] U.S. Cl. .................................... 318/116; 310/308; 361/233
[58] Field of Search ............................. 310/300–310; 361/233, 234; 318/116

[56] References Cited

U.S. PATENT DOCUMENTS

| 3,195,363 | 7/1968 | Stuetzer | 361/234 X |
| 3,461,364 | 8/1969 | Green | 361/233 |
| 3,652,955 | 3/1972 | Cruger et al. | 318/116 X |
| 3,772,537 | 11/1973 | Clifford et al. | 310/309 |

*Primary Examiner*—Donovan F. Duggan
*Attorney, Agent, or Firm*—Wenderoth, Lind & Ponack

[57] ABSTRACT

A controlling unit for a.c. driving an electrostatic device such as an electrostatic display device having a fixed electrode, a resilient sheet electrode and a dielectric layer interposed between the electrodes wherein the sheet electrode is drawn to the outer surface of the fixed electrode to cover the same upon the application of a voltage between the fixed and the sheet electrodes whereas the sheet electrode is kept apart from the fixed electrode upon the removal of the voltage between the electrodes. The controlling unit of this invention includes a resistance in series with an a.c. voltage supply and the electrostatic display device, a triode thyristor switch with a first terminal and a second terminal connected across the fixed and the sheet electrodes, and a switching means for controlling the gate of the thyristor so that the thyristor has an on-off switching function at its leakage current region.

4 Claims, 8 Drawing Figures

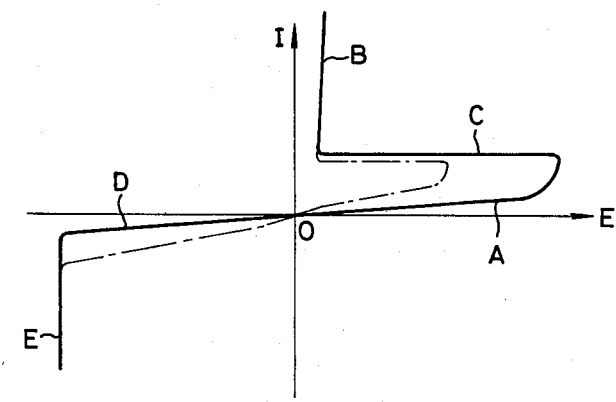
FIG. 4
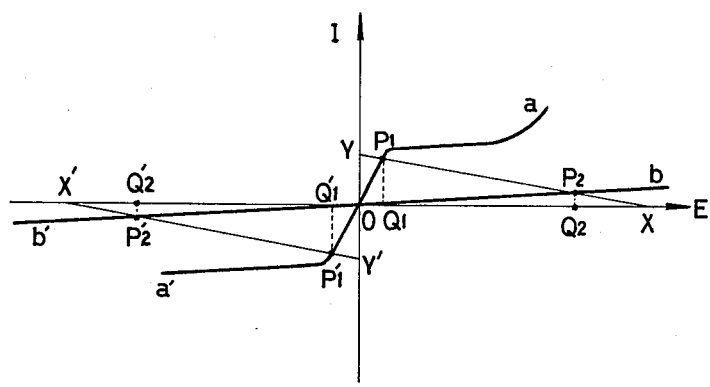
FIG. 5
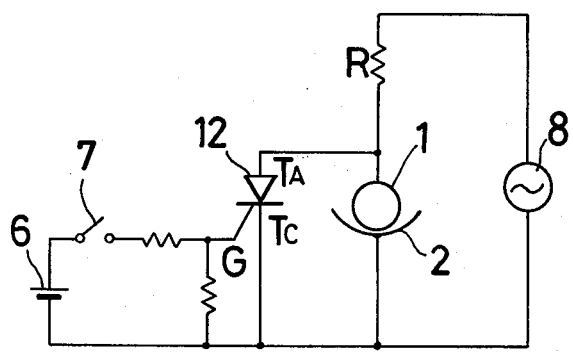
FIG. 6
FIG. 7
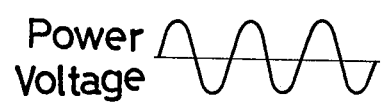
Power Voltage
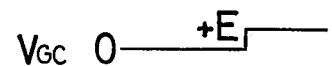
$V_{GC}$
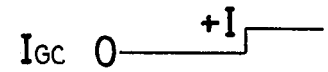
$I_{GC}$
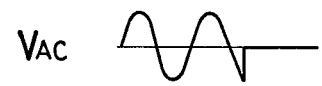
$V_{AC}$

CONTROLLING UNIT FOR A.C. DRIVING AN ELECTROSTATIC DEVICE

This invention relates to a controlling unit for an electrostatically operated device such as an electrostatic display device which operates essentially according to the absolute value of the voltage difference between the electrodes of a capacitor.

The controlling unit of the invention is particularly suitable for use in controlling the operation of an electrostatic display device which, as is shown in FIGS. 1A and 1B, comprises a fixed electrode 1 fixed at one end thereof to a base (not shown) and having a cylindrical or flat outer surface, a resilient sheet electrode 2 fixed at one end thereof to the base adjacent to the fixed electrode 1, and a dielectric layer 3 interposed between the fixed and the sheet electrodes. The sheet electrode 2 is made of, for example, a thin polymer film typically a polyethylene terephthalate film 8 microns in thickness as a core with an electrically conductive metal such as aluminum vacuum deposited thereon.

Hence, when no voltage is applied between the fixed and the sheet electrodes, the sheet electrode 2 is kept away from the outer surface of the fixed electrode 1 as illustrated in FIGS. 1A and 1B by solid lines due to the resilience of the sheet electrode 2. On the other hand, when a voltage is applied between the electrodes 1 and 2, the sheet electrode 2 is drawn to the outer surface of the fixed electrode 1 to cover this outer surface due to the electrostatic force generated between the electrodes 1 and 2, as shown in FIGS. 1A and 1B by the dashed lines. Therefore, when the appearances of the outer surfaces of the fixed and the sheet electrodes are different from each other in their reflectivity, color, pattern, or the letters and the like they carry, a wide variety of displays can be realized through the application of a voltage between the fixed and the sheet electrodes to cause the appearance of the device to change.

Conventionally, a d.c. driving method has been extensively used for driving such an electrostatic display device as described above since on-off control of the device can be easily performed by d.c. driving. An example of a d.c. driving method is shown in FIG. 2, in which the reference numeral 1 designates the fixed electrode, 2 the sheet electrode, 3 a d.c. power source, 4 a high resistance of 5 megaohms for example, 5 a switching transistor, 6 a biasing power source for the transistor 5, and 7 an on-off switch, respectively. An a.c. driving method, however, has been proposed. The method has disadvantages in that the sheet electrode will possibly vibrate when the a.c. power has a low frequency or when the response of the sheet electrode is rapid, and the method needs a driving power source because of the use of a bidirectional triode thyristor, typically a TRIAC, results in complicated circuits.

Another difficulty encountered with a.c. driving the electrostatic display device resides in the switching means even when the a.c. voltage used as the power source has a sufficiently high frequency so as not to cause vibration of the sheet electrode. For example, when the fixed electrode 1 and the sheet electrode 2 are short-circuited through a transistor switch, a complicated controlling circuit is required which includes, as is shown in FIG. 3, an n-p-n transistor 9 for short-circuiting the electrodes 1 and 2 during each half cycle when the fixed electrode 1 is positive with respect to the sheet electrode 2, a p-n-p transistor 10 for short-circuiting the electrodes during each half cycle when the sheet electrode is positive with respect to the fixed electrode, and a transistor 11 forming an inverter circuit for energizing the transistor 10 from biasing power source 6.

It is also to be noted that a bidirectional triode such as a TRIAC has been used as a bidirectional switching element, making use of the switching characteristics in its negative resistance region. However, only a relatively large current can be switched an extremely small current such as 1 mA or less, as is the case with the invention, cannot be switched by a bidirectional triode thyristor.

An object of the invention is, therefore, to provide a controlling unit for a.c. driving an electrostatically operated device, simple in construction and inexpensive in manufacture. More particularly, the invention is to provide a controlling unit suitable for a.c. driving an electrostatic display device which includes capacitance as essential operating feature.

Other objects and features of the invention will be apparent from the following description with reference to the drawings, in which:

FIG. 4 is the characteristic curve of an SCR used as a triode thyristor in the invention;

FIG. 5 is the characteristic curve of the SCR of FIG. 4 in the leakage current region thereof;

FIG. 6 is a circuit diagram of an embodiment of the controlling unit of the invention for a.c. driving the electrostatic display device; and FIG. 7 are illustrations explaining the functions of the circuit diagram shown in FIG. 6.

Figure 1A:
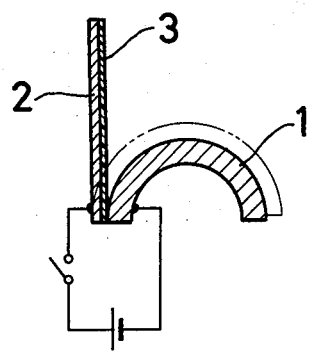
FIGS. 1A and 1B are longitudinal sectional views showing embodiments of a fixed electrode, a sheet electrode and a dielectric layer of an electrostatic display device which may be a.c. driven by the controlling unit of the invention.
Figure 1B:
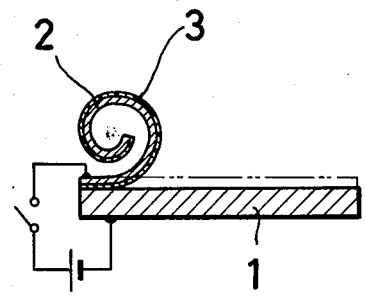
Figure 2:
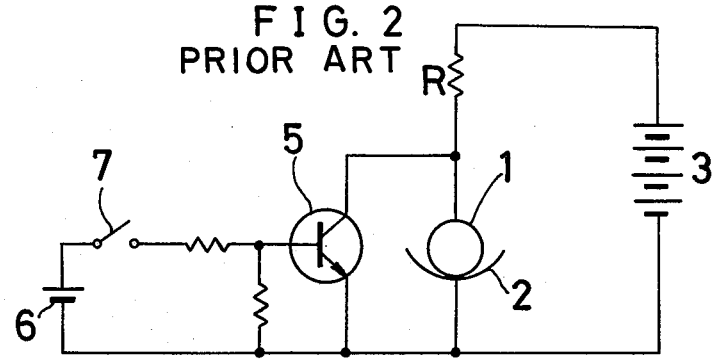
FIG. 2 is a conventional circuit diagram for d.c. driving the electrostatic display device of FIG. 1.
Figure 3:
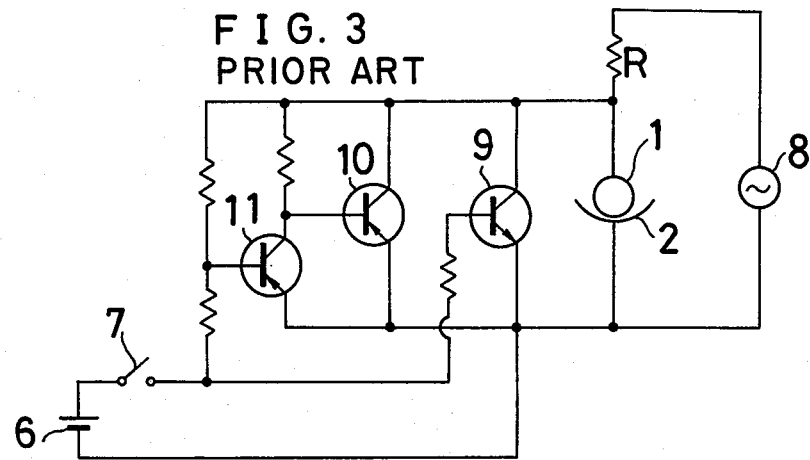
FIG. 3 is a conventional circuit diagram for a.c. driving the electrostatic display device of FIG. 1.

The present invention makes use of notable characteristics in the leakage current region of a triode thyristor.

The voltage-current characteristic curve of an SCR, one of the triode thyristors used in the invention, is shown in FIG. 4. A negative resistance region C is in the first quadrant between the off-state A and the on-state B, and a reverse blocking state D and a reverse voltage breakdown E are in the third quadrant. Such an SCR has been used, therefore, as a unidirectional switching element between the off-state A and the on-state B.

However, an examination of the voltage-current characteristics of the SCR at a very small current reveals that the SCR has a clear bidirectionality in the leakage current region, and that no negative resistance exists in that region, thereby permitting the anode-cathode conductance both in the forward and reverse directions through the application of a gate current.

FIG. 5 shows a detailed dynamic characteristic curve of the SCR of FIG. 4 in the leakage current region, in which the curve a-o-a' is the voltage-current characteristic curve for a small gate current $I_G$, for example, 0.4 mA, and the curve b-o-b' is the voltage-current characteristic curve for an $I_G$ of zero. Now, assume that the a.c. power voltage has maximum positive and negative voltages of X and X', respectively, and the load resistance is fixed, and then load lines X-Y and X'-Y' are established. Therefore, when $I_G$ is zero, the anode-cathode voltage $V_{AC}$ is an a.c. voltage with an amplitude of $Q_2Q_2'$, and when $I_G$ is 0.4 mA, $V_{AC}$ is an a.c. voltage with an amplitude of $Q_1Q_1'$. According to actual experiments, the point $P_1$ the intersection between the load line XY and the voltage-current characteristic curve for an $I_G$ of 0.4 mA a-o-a' has a voltage smaller than 0.1 volts and a current flow smaller than 0.2 mA. That is, $Q_2Q_2'$ is substantialy comparable with the power voltage XX' and $Q_1Q_1'$ is substantially zero.

In the embodiment of the electrostatic display device previously mentioned, the capacitance between the fixed electrode and the sheet electrode is about 200 pF when the outer surface of the fixed electrode is covered by the sheet electrode. When an a.c. voltage of 180 volts (RMS) is applied between the electrodes, the current flow therethrough is smaller than 0.1 mA. Such a small current flow is apparently regarded as leakage current flows. Now, the leakage current in this specification includes the off-state current flow in the first quadrant of the voltage-current characteristic diagram of the SCR as well as the reverse current flow in the third quadrant, and usually means a very small current flow of less than or equal to a few hundredths of the rated current.

FIG. 6 shows an embodiment of the a.c. driving unit of the invention coupled to the electrostatic display device. The a.c. driving unit comprises a high resistance of, for example, about 2 megaohms in series with an a.c. voltage supply 8 and the electrostatic display device including the fixed electrode 1 and the sheet electrode 2, and an SCR designated by the reference numeral 12 having an anode $T_A$ and a cathode $T_C$ connected to the fixed electrode and the sheet electrode, respectively, and having a gate G connected to a pulse signal generator shown equivalently as a d.c. supply 6 coupled with a switch 7.

In operation, when an a.c. voltage is applied between the fixed and the sheet electrodes from the a.c. power supply 8, as shown in FIG. 7, closing the switch 7 changes the gate-cathode voltage $V_{GC}$ from 0 to $+E$, causing the cathode-anode current $I_{GC}$ to change from 0 to $+I$. This in turn causes the cathode and the anode to be substantially short-circuited as explained hereinbefore with reference to FIG. 4, therefore the voltage between the fixed electrode and the sheet electrode is removed so that the sheet electrode is restored to its original position.

As mentioned above, the invention makes the best use of the characteristics in the leakage current region of a thyristor, which have not been noted even the manufactures of thyristors, and naturally have not been previously used for any purpose. However, since there exists a substantially symmetric voltage-current characteristic curve with no negative resistance over the first quadrant and the third quadrant in the leakage current region of a thyristor, as mentioned before, the operating points can be controlled through the gate current only and a very simple circuit construction for a.c. driving an electrostatic device can be realized. The a.c. driving of the invention naturally permits the use of a commercial a.c. supply, which therefore makes the supply device simple.

The a.c. driving of the invention has a further advantage over the conventional d.c. driving. In the conventional d.c. driving the electrostatic display device, residual electric charges on the electrodes are often apt to cause the unstable flapping movement of the sheet electrode after the electrodes are short-circuited. But according to the a.c. driving of the invention, no electric remains on the electrodes when short-circuited through a thyristor, ensuring the stable movement of the sheet electrode.

What is claimed is:

1. A controlling unit for driving an electrostatic device from an a.c. power source, the electrostatic device having a fixed electrode, a resilient flexible sheet electrode and a dielectric layer disposed between the fixed electrode and the sheet electrode, the resiliency of the sheet electrode normally drawing the sheet electrode away from the fixed electrode and the application of a voltage across the electrodes causing the sheet electrode to be drawn toward the fixed electrode, said controlling unit comprising:

a resistor connected in series with the electrostatic device and the a.c. power source;

a triode thyristor switching device having a first terminal connected to the fixed terminal of the electrostatic device and a second terminal connected to the sheet terminal of the electrostatic device for conducting a current between said first and second terminals up to a predetermined rated current, said triode thyristor switching device further having a gate terminal for controlling said current conducted between said first and second terminals; and a switching means connected to said gate terminal of said trode thyristor switching device for selectively applying a gate signal to said gate terminal, said gate signal having a magnitude for causing said current conducted between said first and second terminals of said triode thyristor switching device to be in the leakage region, said current being less than or equal to a few hundredths of said rated current, whereby the sheet electrode is drawn away from the fixed electrode when said gate signal is applied to said gate terminal and the sheet electrode is drawn toward the fixed electrode when said gate signal is not applied to said gate terminal.

2. A controlling unit as claimed in claim 1, wherein said triode thyristor switching device comprises a unidirectional triode thyristor.

3. A controlling unit as claimed in claim 1, wherein said trode thyristor switching device comprises a bidirectional triode thyristor.

4. A controlling unit for driving an electrostatic device from an a.c. power source, the electrostatic device having a first terminal and a second terminal, said controlling unit comprising:

a resistor connected in series with the electrostatic device and the a.c. power source;

a triode thyristor switching device having a first terminal connected to the first terminal of the electrostatic device and a second terminal connected to the second terminal of the electrostatic device for conducting a current between said first and second terminals up to a predetermined rated current, said trode thyristor switching device further having a gate terminal for controlling said current conducted between said first and second terminals; and a switching means connected to said gate terminal of said triode thyristor switching device for selectively applying a gate signal to said gate terminal, said gate signal having a magnitude for causing said current between said first and second terminals of said triode thyristor switching device to be in the leakage region, said current being less than or equal to a few hundredths of said rated current.

* * * * *